(12) United States Patent
Shaffer

(10) Patent No.: US 12,191,076 B2
(45) Date of Patent: Jan. 7, 2025

(54) SOLENOID ASSEMBLY ACTUATION USING RESONANT FREQUENCY CURRENT CONTROLLER CIRCUIT

(71) Applicant: Hanchett Entry Systems, Inc., Phoenix, AZ (US)

(72) Inventor: Randall Shaffer, Phoenix, AZ (US)

(73) Assignee: HANCHETT ENTRY SYSTEMS, INC., Phoenix, AZ (US)

( * ) Notice: Subject to any disclaimer, the term of this patent is extended or adjusted under 35 U.S.C. 154(b) by 0 days.

(21) Appl. No.: 18/424,154

(22) Filed: Jan. 26, 2024

(65) Prior Publication Data

US 2024/0242870 A1  Jul. 18, 2024

Related U.S. Application Data

(63) Continuation of application No. 17/881,690, filed on Aug. 5, 2022, now Pat. No. 11,915,869, which is a (Continued)

(51) Int. Cl.
*H01F 7/18* (2006.01)
*H01F 7/06* (2006.01)
*H02M 3/335* (2006.01)

(52) U.S. Cl.
CPC ............ *H01F 7/18* (2013.01); *H01F 7/064* (2013.01); *H02M 3/335* (2013.01); *H02M 3/33523* (2013.01)

(58) Field of Classification Search
CPC .......... H01F 7/18; H01F 7/064; H02M 3/335; H02M 3/33523; H02M 3/003
(Continued)

(56) References Cited

U.S. PATENT DOCUMENTS 3,663,949 A  5/1972  Froeschle
3,894,417 A  7/1975  Taniyama
(Continued)

FOREIGN PATENT DOCUMENTS

CA  2789888  3/2013
CN  204065891  12/2014
(Continued)

OTHER PUBLICATIONS

Sun, Pinping, "Final Office Action", U.S. Appl. No. 17/078,135, filed Oct. 23, 2020, dated May 11, 2022, 20 pages.
(Continued)

*Primary Examiner* — Rexford N Barnie
*Assistant Examiner* — Swarna N Chowdhuri
(74) *Attorney, Agent, or Firm* — Woods Oviatt Gilman LLP; Dennis B. Danella, Esq.

(57) ABSTRACT

A latch system includes a releasably secured latch or keeper and a solenoid assembly. The solenoid assembly has a solenoid driver coupled to a power supply, a switching circuit connected with the solenoid driver, and a function generator to selectively adjust a frequency of a pick current output from the power supply and provided to the solenoid driver. The frequency is adjusted until the pick current induces a resulting vibration of said latch system sufficient to free a preloaded latch or keeper. The adjusted frequency may be a target frequency or a range of frequencies. Also included may be a preload sensor. When a preload is sensed, the frequency may be adjusted by the function generator until the pick current induces a resulting vibration of said latch system sufficient to free a preloaded latch or keeper.

26 Claims, 7 Drawing Sheets

Related U.S. Application Data continuation of application No. 17/078,134, filed on Oct. 23, 2020, now Pat. No. 11,424,061, which is a continuation-in-part of application No. 16/406,464, filed on May 8, 2019, now Pat. No. 10,964,467, which is a continuation-in-part of application No. 15/098,522, filed on Apr. 14, 2016, now Pat. No. 10,378,242.

(60) Provisional application No. 62/147,478, filed on Apr. 14, 2015.

(58) Field of Classification Search
USPC ..................................................... 361/160
See application file for complete search history.

(56) References Cited

U.S. PATENT DOCUMENTS

| | | |
|---|---|---|
| 4,102,526 A | 7/1978 | Hargraves |
| 4,536,728 A | 8/1985 | Cyrot |
| 4,542,440 A | 9/1985 | Chetty et al. |
| 4,841,207 A | 6/1989 | Cheyne |
| 4,872,100 A | 10/1989 | Diaz |
| 5,100,184 A | 3/1992 | Schmitt |
| 5,343,759 A | 9/1994 | Hesthamar et al. |
| 5,432,693 A | 7/1995 | Anderson |
| 5,673,166 A | 9/1997 | Hoffman |
| 5,933,067 A | 8/1999 | Frolov |
| 6,352,317 B1 | 3/2002 | Blazic et al. |
| 6,356,043 B2 | 3/2002 | Baum |
| 6,934,140 B1 | 8/2005 | Rober et al. |
| 7,046,111 B2 | 5/2006 | Sigl |
| 7,106,593 B2 | 9/2006 | Stabile et al. |
| 7,158,361 B2 | 1/2007 | Horn |
| 7,212,173 B2 | 5/2007 | Chen et al. |
| 7,430,102 B2 | 9/2008 | Groh et al. |
| 7,813,101 B2 | 10/2010 | Morikawa |
| 8,294,304 B1 | 10/2012 | Ledbetter et al. |
| 8,295,695 B2 | 10/2012 | Yoshida et al. |
| 8,454,063 B2 | 6/2013 | David et al. |
| 8,503,152 B2 | 8/2013 | Feltz et al. |
| 8,941,417 B2 | 1/2015 | Dornseifer et al. |
| 9,022,350 B2 | 5/2015 | Jung |
| 9,183,976 B2 | 11/2015 | Hanchett, Jr. et al. |
| 9,787,315 B1 | 10/2017 | Watanabe et al. |
| 10,371,016 B2 | 8/2019 | McCarthy, Jr. et al. |
| 11,424,061 B2 | 8/2022 | Randall |
| 2001/0032999 A1 | 10/2001 | Yoshida |
| 2003/0016102 A1* | 1/2003 | Hoepken .................. E05B 47/00 70/262 |
| 2003/0053279 A1 | 3/2003 | Meehleder et al. |
| 2003/0128555 A1 | 7/2003 | Schemmann et al. |
| 2004/0057183 A1 | 3/2004 | Vincent et al. |
| 2005/0180078 A1 | 8/2005 | Sievers et al. |
| 2005/0194052 A1 | 9/2005 | Gandrud |
| 2006/0221534 A1 | 10/2006 | Oide |
| 2007/0120498 A1 | 5/2007 | Caiafa et al. |
| 2008/0238391 A1* | 10/2008 | Williams .............. H01F 7/1844 323/283 |
| 2009/0237856 A1 | 9/2009 | Ishitsuka et al. |
| 2009/0256534 A1 | 10/2009 | Videtich et al. |
| 2010/0045053 A1 | 2/2010 | Dye et al. |
| 2010/0082169 A1 | 4/2010 | Crist et al. |
| 2010/0156314 A1 | 6/2010 | Wang et al. |
| 2011/0241629 A1 | 10/2011 | Jordan |
| 2013/0249537 A1 | 9/2013 | Kahl et al. |
| 2014/0109479 A1 | 4/2014 | Morstatt et al. |
| 2015/0359702 A1 | 12/2015 | Rubin |
| 2016/0307683 A1 | 10/2016 | Davis et al. |
| 2016/0310149 A1 | 10/2016 | Downey |
| 2017/0193762 A1 | 7/2017 | Warren et al. |
| 2017/0279287 A1 | 9/2017 | Solodovnik et al. |
| 2018/0075961 A1 | 3/2018 | Davis et al. |
| 2019/0267173 A1 | 8/2019 | Shaffer et al. |
| 2019/0359702 A1* | 11/2019 | Mann ..................... A61P 29/00 |
| 2021/0012938 A1 | 1/2021 | Dams |

FOREIGN PATENT DOCUMENTS

| | | |
|---|---|---|
| DE | 102008014976 | 11/2008 |
| EP | 1437463 | 7/2004 |
| FR | 2352381 | 12/1977 |
| GB | 2479740 | 10/2011 |
| GB | 2557973 | 7/2018 |
| JP | 2006302838 | 11/2006 |
| WO | 2005030528 | 4/2005 |
| WO | 2014028332 | 2/2014 |

OTHER PUBLICATIONS

Martin, Tom "Examination Report under Section 18(3)", dated Jun. 28, 2022 for United Kingdom Application No. GB2006165.1, South Wales, United Kingdom, 3 pages.

Sun, Pinping, "Notice of Allowance", U.S. Appl. No. 16/406,464, filed May 8, 2019, dated Dec. 17, 2020, 38 pages.

Sun, Pinping, "Office Action", U.S. Appl. No. 17/078,135, filed Oct. 23, 2020, dated Dec. 24, 2021, 34 pages.

Howe, Jessica, "How to Replace a Tailgate Lock Solenoid" 2016 (3 pages).

Watt, John, "Combined Search and Examination Report under Sections 17 and 18(3)"; report dated Apr. 9, 2021 for Application No. GB2017818.2; UK Intellectual Patent Office, South Wales, 8 pages.

Watt, John, "Examination Report under Section 18(3)", UK Patent Application No. GB2006165.1 filed Apr. 27, 2020, dated Jul. 15, 2021, 3 pages.

Don Wilcher, "Learn Electronics with Ardurino," Jul. 2012, p. 74-75, Apress, 1st ed., 2 pages.

Watt, John, "Combined Search and Examination Report under Sections 17 and 18(3)", UK Patent Application No. GB2006165.1 filed Apr. 27, 2020, dated Sep. 24, 2020, 7 pages.

Sun, Pinping, "Office Action", U.S. Appl. No. 16/406,464, filed May 8, 2019, dated Sep. 24, 2020, 27 pages.

Sun, Pinping, "Office Action", U.S. Appl. No. 17/078,134, filed Oct. 23, 2020, dated Dec. 1, 2021, 12 pages.

Sun, Pinping, "Non-Final Rejection", U.S. Appl. No. 17/881,690, filed Aug. 5, 2022, dated Dec. 23, 2022, 27 pages.

Chowdhuri, Swarna, "Final Rejection", U.S. Appl. No. 17/881,690, filed Aug. 5, 2022, dated Jun. 16, 2023, 27 pages.

* cited by examiner

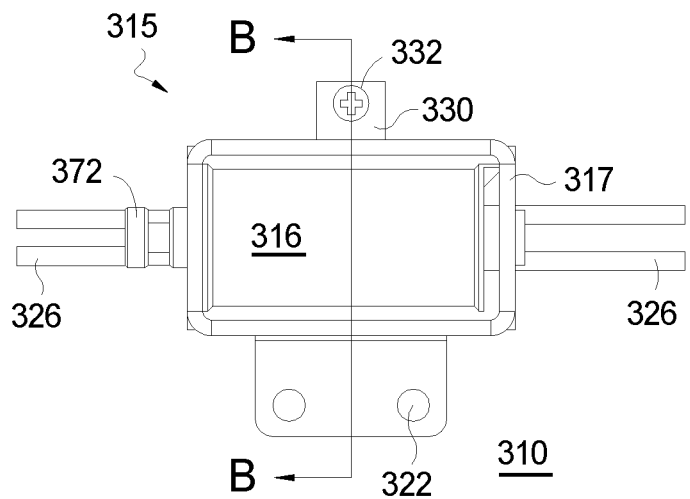
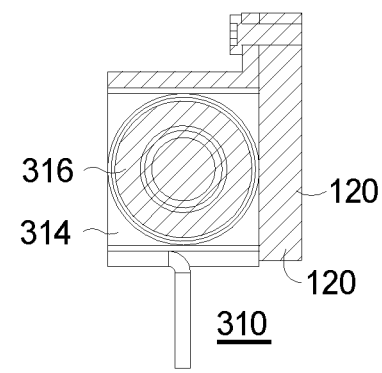
FIG. 6A
SECTION B-B
FIG. 6B
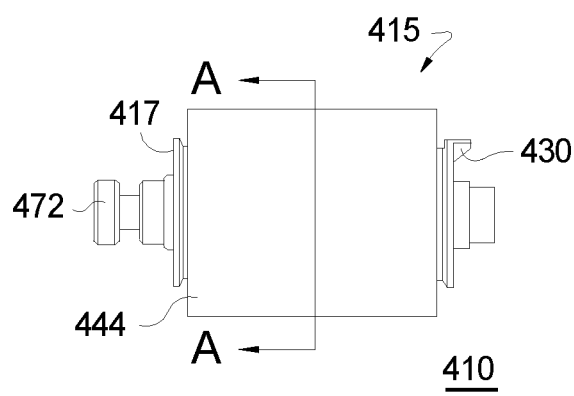
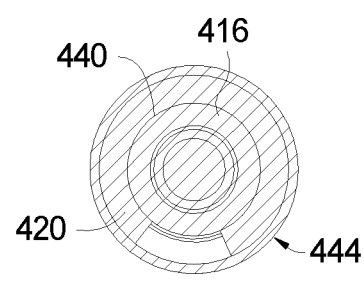
FIG. 7A
SECTION A-A
FIG. 7B

SOLENOID ASSEMBLY ACTUATION USING RESONANT FREQUENCY CURRENT CONTROLLER CIRCUIT

CROSS REFERENCE TO RELATED APPLICATIONS

This application is a continuation of U.S. patent application Ser. No. 17/881,690, filed on Aug. 5, 2022, which is a continuation of U.S. patent application Ser. No. 17/078,134, now U.S. Pat. No. 11,424,061, filed Oct. 23, 2020, which is a continuation-in-part of U.S. patent application Ser. No. 16/406,464, now U.S. Pat. No. 10,964,467, filed May 8, 2019, entitled SOLENOID ASSEMBLY WITH INCLUDED CONSTANT-CURRENT CONTROLLER CIRCUIT, which is a continuation-in-part of U.S. patent application Ser. No. 15/098,522, now U.S. Pat. No. 10,378,242, filed Apr. 14, 2016, entitled CONSTANT-CURRENT CONTROLLER FOR INDUCTIVE LOAD, which claims the benefit of U.S. Provisional Patent Application No. 62/147,478, filed Apr. 14, 2015, the contents of which are hereby incorporated by reference in their entirety.

TECHNICAL FIELD

The present invention relates to a current controller for an inductive load such as a solenoid driver used to actuate a mechanism such as an electric door latch or strike. Specifically, the invention relates to a current controller circuitry and method configured to selectively and efficiently overcome a preload condition imposed on the latch or a keeper of the strike through actuation of the solenoid driver using a system resonant frequency current.

BACKGROUND OF THE INVENTION

Solenoids are often used as the driver to operate many types of electromechanical devices, such as for example electromechanical door latches or strikes. In the use of solenoids as drivers in electromechanical door latches or strikes, when power is applied to the solenoid, the solenoid is powered away from the default state to bias a return spring. The solenoid will maintain the bias as long as power is supplied to the solenoid. Once power has been intentionally removed, or otherwise, such as through a power outage from the grid or as a result of a fire, the solenoid returns to its default position. Depending on the type latch or strike (fail-safe or fail-secure), the default position may place the latch or strike in a locked (fail-secure) or unlocked (fail-safe) state. In a "fail-safe" system, as long as the latch or strike remains locked, power has to be supplied to the solenoid to maintain stored energy in the return spring. In a "fail-secure" system, the opposite is true.

The current to pull in the plunger of the solenoid against the return spring is referred to as the "pick" current and the current to hold the plunger against the return spring is referred to as the "hold" current. Typically, the pick current is much greater than the hold current regardless of whether the solenoid is used in a "fail-safe" or "fail-secure" system. Power provided to the solenoid of an electric latch or strike is most efficiently maintained if a constant current is provided to the inductive load.

In U.S. Pat. No. 10,378,242, assigned to Hanchett Entry Systems, Inc. ("the '242 Patent"), a constant-current controller circuitry operable to supply a constant current to an inductive load such as a solenoid driver of an electromechanical device is disclosed. The circuitry includes a switching circuit comprising a primary switch and a secondary switch. The switches are sequentially opened and closed as timed events whereby a periodic current to the solenoid becomes constant when a sufficiently large switching frequency is implemented. The controller may be operated as a pulse-width modulated controller. In one aspect of the circuit disclosed, the primary switch is a MOSFET.

In U.S. patent application Ser. No. 16/406,464, assigned to Hanchett Entry Systems, Inc. ("the '464 application"), the constant-current controller circuit includes a much more compact GaNFET transistor as the primary switch, wherein a resulting, smaller PCB containing the GaNFET and its associated electronic components may be integrated with and made part of a solenoid assembly to simplify conversion of an electromechanical device to one having constant current circuitry.

Overcoming a preload placed on a latch of an electric latch or a keeper of an electric strike is recognized as a major problem in the field. In a solenoid actuated, fail-secure electric latch or keeper, the pull-in strength of the solenoid is designed to retract the plunger and, in turn, the latch or strike to allow the door to be released from the door frame. However, a pre-load placed on the latch or keeper when the solenoid is attempting to pull in the plunger may cause the latch/keeper to act sluggish or not to move at all. Pre-load may be caused, for example, by a mis-aligned latch to strike, a sagging door or wind blowing against the door. It may also be caused if the exiting person tries to open the door before the latch or keeper of a strike has time to retract. This problem may sometimes be solved by utilizing a bigger solenoid than is needed under normal operations. However, this increases cost while reducing energy efficiency.

While the aforementioned '242 patent and '464 application describe a constant-current controller circuits that might be used with an electromechanical device such as an electric lock or strike to improve operation efficiency, neither address preload conditions that may be imposed on the electric lock or keeper.

Therefore, there exists a need for a controller circuit that selectively supplies a pick current at the latch system's resonant frequency so as to alleviate a preload condition on the latch or keeper (hereinafter referred to collectively as a "latch").

SUMMARY OF THE INVENTION

What is presented is a latch assembly or system that includes a releasably secured latch and/or a keeper. A solenoid assembly is used to drive an associated electromechanical device. The solenoid assembly has a solenoid driver coupled to a power supply, a switching circuit connected with the solenoid driver, and a function generator to selectively adjust a frequency of a pick current output from the power supply and provided to the solenoid driver. The frequency is adjusted by the function generator until the pick current induces a resulting vibration of the latch system, and wherein upon inducing the resulting vibration of the latch system the latch or keeper is released from a preloaded condition.

In accordance with an aspect of the present invention, the function generator may be a waveform generator and the switching circuit may include a metal-oxide-semiconductor field effect transistor (MOSFET) or a gallium nitride field effect transistor (GaNFET).

In accordance with another aspect of the invention, a method for releasing a preloaded latch or a keeper of an electromechanical latch system is provided. At a first step, when the latch of a fail-secure electromechanical latch system is in its default, locked condition, the solenoid driver of the latch is not energized. At a next step, access credentials are presented to and verified by an authentication device wherein the authentication device communicates with a provided waveform generator to supply a baseline (or base) pick current to the solenoid driver at a sufficient level to pull back the latch or keeper under normal operating conditions (i.e., when the latch or keeper is not preloaded). At a next step, latch a preload sensor interrogates whether a latch or keeper preload condition exists. If the preload sensor determines that a latch or keeper preload does not exist, a communication is provided to the waveform generator to reduce the baseline pick current to a hold current to the solenoid driver at a sufficient level to hold the latch or keeper in a released, unlocked condition. Upon receipt of the communication from the preload sensor by the waveform generator, the hold current may be supplied by the waveform generator after a predetermined period of time elapses since application of the base pick current to assure retraction of the latch or keeper is complete or after retraction of the latch or keeper is confirmed by the preload sensor. If the preload sensor determines that a latch or keeper preload does exist in a further step, a communication is provided to the waveform generator to supply a pick current at a predetermined target frequency or predetermined range of frequencies sufficient to free the latch or keeper from its preload condition to a released, unlocked condition. Thereafter, a hold current is provided to the solenoid driver. In yet another step, if a latch or keeper preload condition continues to be sensed by the preload sensor, the target frequency or the range of frequencies may be reapplied, or an enlarged range of frequencies may be applied as a pick current and an optional alert signal may be provided indicating that repairs to the latch system are needed.

In accordance with another aspect of the invention, a method is disclosed wherein, a target frequency or a range of frequencies sufficient to free a preloaded latch or keeper has not been predetermined. In a first step, after the latch or keeper preload sensor has sensed that a latch or keeper preload exists, waveform generator may supply current at a varying frequency, sweeping the frequency between the base pick current frequency and a pre-designated, outer limit of pick current frequencies so as to force the latch system to vibrate and to release the preloaded latch or keeper. Once the current frequency sweep is completed sufficient to free the latch or keeper, the method proceeds to provide a hold current to the solenoid driver.

In yet another embodiment, a method is provided wherein each time access credentials are presented to and verified by the authentication device, the baseline pick current is provided to the solenoid driver followed by a sweep through the a predetermined range of frequencies needed to free a latch or a keeper from a preload condition in the event the latch or keeper is preloaded to assure that the latch becomes fully retracted. A preload sensor may be added to confirm full latch or keeper retraction in this embodiment.

In a further embodiment, a latch system including a latch or a keeper, and a solenoid assembly is provided, wherein the solenoid assembly is used to drive the latch or the keeper of the latch system to a retracted position. The solenoid assembly comprises a solenoid driver coupled to a power supply, a preload sensor, and a function generator in communication with the solenoid driver and the preload sensor. The preload sensor includes a timer and a latch position sensor or keeper position sensor. The preload sensor is configured to sense whether a preloaded condition is present at the latch or the keeper. The function generator is configured to selectively sweep a frequency of a pick current across a first range of frequencies, wherein the pick current is output from the power supply and provided to the solenoid driver. When the preload sensor determines a preloaded condition is present at the latch or the keeper, the frequency is swept across the first range of frequencies by the function generator until the pick current induces a resulting vibration of the latch system at a target frequency within the first range of frequencies. Upon inducing the resulting vibration of the latch system, the latch or the keeper is released from the preloaded condition. A second range of frequencies is determined after the first range of frequencies is swept and falls within the first range of frequencies, wherein the second range of frequencies includes the target frequency. The second range of frequencies is swept by the function generator to induce the resulting vibration of the latch system and release the latch or the keeper from the preloaded condition.

In another embodiment, a method for releasing a latch or a keeper of a latch system from a preloaded condition is provided, wherein the latch system further comprises a solenoid driver, a preload sensor, and a function generator. The solenoid driver is configured for releasing the latch or the keeper. The preload sensor includes a timer and a latch position sensor or keeper position sensor, and is configured to sense whether a preloaded condition is present at the latch or the keeper. The function generator is configured for providing a pick current to the solenoid driver. The method comprises steps of: a) sensing that the preloaded condition is present at the latch or the keeper; b) providing the pick current to the solenoid driver by sweeping a first range of pick current frequencies using the function generator to identify a target frequency that induces a resulting vibration of the latch system; c) after the first range of pick current frequencies is swept, establishing a second range of pick current frequencies that falls within the first range of pick current frequencies, wherein the second range of pick current frequencies includes the target frequency; and d) applying the pick current at the second range of pick current frequencies to the solenoid driver to release the latch or the keeper from the preloaded condition by the induced resulting vibration.

A method for releasing a latch or a keeper of a latch system from a preloaded condition is provided, wherein the latch system further comprises a solenoid driver, a preload sensor, and a function generator. The solenoid driver is configured for releasing the latch or the keeper. The preload sensor includes a timer and a position sensor, and is configured to sense whether the preloaded condition is present at the latch or the keeper, wherein the function generator is configured for providing a pick current to the solenoid driver. The method comprises steps of: a) sensing that the preloaded condition is present at the latch or the keeper; b) providing the pick current to the solenoid driver by sweeping a first range of pick current frequencies using the function generator to identify a target frequency that induces a resulting vibration of the latch system; c) after the first range of pick current frequencies is swept, establishing a second range of pick current frequencies that falls within the first range of pick current frequencies, wherein the second range of pick current frequencies includes the target frequency; d) applying the pick current at the second range of pick current frequencies to the solenoid driver to release the latch or the keeper from the preloaded condition by the induced resulting vibration; e) sweeping a third range of pick current frequencies using the function generator to identify a second target frequency that induces the resulting vibration of the latch system; f) establishing a fourth range of pick current frequencies that falls within the third range of pick current frequencies, wherein the fourth range of pick current frequencies includes the second target frequency, wherein the fourth range of pick current frequencies is different than the second range of pick current frequencies; and g) applying the pick current at the fourth range of pick current frequencies to the solenoid driver to release the latch or the keeper from the preloaded condition by the induced resulting vibration.

BRIEF DESCRIPTION OF THE DRAWINGS

The present invention will now be described, by way of example, with reference to the accompanying drawings, in which:

FIGS. 6A and 6B are views of a solenoid assembly with integrated constant-current controller circuit as disclosed in the '464 application;

FIGS. 7A and 7B are views of another solenoid assembly with integrated constant-current controller circuit as disclosed in the '464 application;

Corresponding reference characters indicate corresponding parts throughout the several views. The exemplifications set out herein illustrate currently preferred embodiments of the invention, and such exemplifications are not to be construed as limiting the scope of the invention in any manner.

DESCRIPTION OF THE PREFERRED EMBODIMENTS

Figure 1:
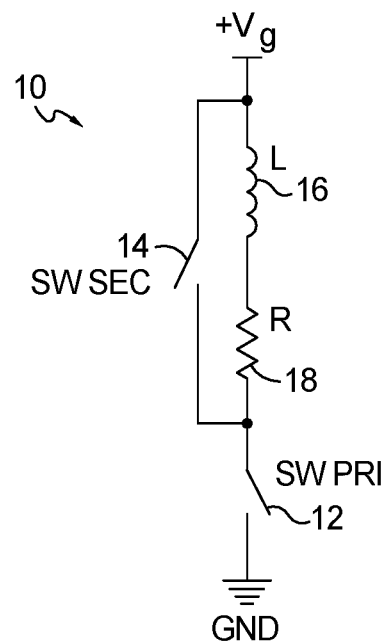
FIG. 1 is a functional schematic of a switching circuit, as disclosed in the '242 patent.

As disclosed in the '242 patent, a functional schematic of the switching circuit 10 that produces constant current in an inductive load via switches controlled by pulse-width modulation (PWM) is shown in FIG. 1. There are two switches; a primary switch 12 and a secondary switch 14. When primary switch 12 is closed, the secondary switch 14 is open. When the primary switch 12 is open, the secondary switch 14 is closed. The series resistance (R), indicated in the circuit as resistor 18, is the sum of the coil resistance and the load resistance. Coil inductance and total circuit resistance comprise the inductive load.

When primary switch 12 is closed, source voltage ($V_s$) is applied across inductor ("coil") 16 and resistor 18. However since coil 16 opposes any change in current flow by producing a counter electromotive force (EMF) equal to the source voltage, current flow through coil 16 and resistor 18 is zero at the instant the primary switch 12 is closed, i.e., ($t_0$). Once primary switch 12 is closed, the counter EMF begins to decay until the voltage across coil 16 and resistor 18 equals the source voltage $V_s$, thereby allowing a current to flow through coil 16 and resistor 18. The time interval in which primary switch 12 is closed may be defined as $t_{on}$.

At the beginning of the time interval when secondary switch 14 is closed and primary switch 12 is opened (i.e. from $t_{on}$ until the end of the cycle (T)), there is no longer a source voltage Vs across coil 16. Once again, coil 16 opposes the change in current flow by producing a positive EMF equal to the source voltage Vs in the direction that was the source voltage's direction. Therefore, current continues to flow through coil 16 and resistor 18 without source voltage Vs being applied. From $t_{on}$ to the end of the cycle T, current through and voltage across coil 16 and resistor 18 decays to zero via the EMF discharged by coil 16. As such, the current in the inductive load is dependent upon the circuit parameters and the rate at which the switches 12 and 14 are opened and closed with respect to each other. This rate is the PWM frequency (f).

From the above discussion, it can be understood that current flow may be held constant by increasing the frequency in which the switches 12 and 14 are opened and closed. If the primary switch 12 is closed before the current decays to zero, the initial current becomes the boundary current. The load current is equal to the boundary current at the beginning and end of each period T. Non-zero boundary current increases the average value of the load current. As the period T is decreased substantially less than the L/R time constant, wherein L/R is the ratio of coil inductance to circuit resistance, the current may be held to any value between 0 and Vs/R by varying the duty ratio of primary switch 12, where the duty ratio is defined by $t_{on}/T$. This constant current control is especially useful since, in the example of a magnetic lock or solenoid driver, power to the lock can be precisely controlled by varying the duty ratio (i.e., power can be increased to resist an instantaneous and unwanted attempt to open the door yet be reduced while the door is at idle). That is, for a sufficiently high frequency, the current is constant and can be maintained by a PWM controller so as to be any value between 0 and $V_s/R$.

Figure 2:
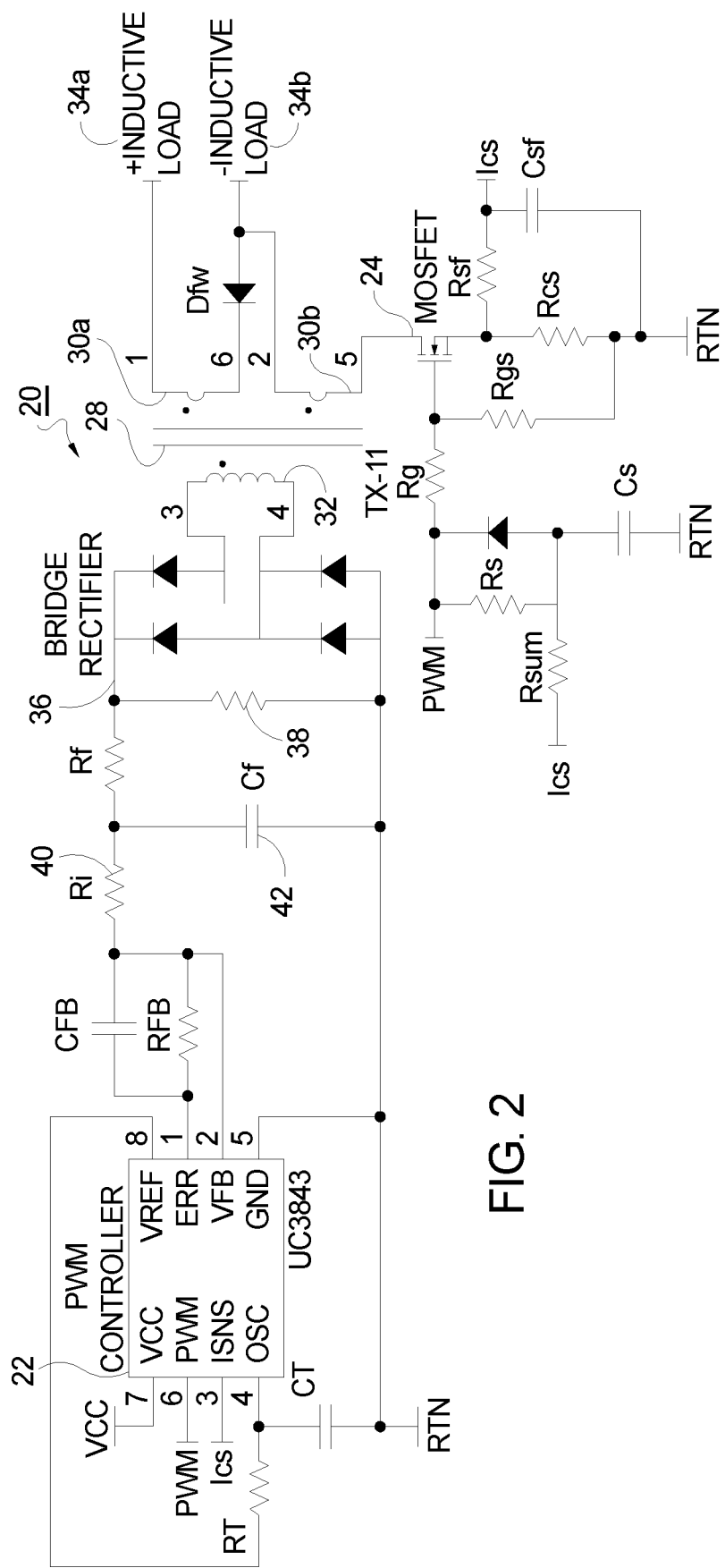
FIG. 2 is a schematic of an embodiment of a constant current PWM controller circuit, as disclosed in the '242 patent.

Further in regard to the disclosure made in the '242 patent, FIG. 2 depicts a constant-current controller circuit that may be used in conjunction with an electric latch or strike. It has been found that power to an access control device having inductive load actuator, such as but not necessarily limited to either a magnetic lock or a solenoid driver, is most efficiently provided if a constant current is provided to the inductive load actuator. An exemplary circuit 20 for a constant-current PWM controller 22 is shown in FIG. 2. The circuit makes use of a PWM controller integrated circuit 22 with current sensing used as the feedback mechanism. The primary switch 24 is typically a MOSFET (analogous to primary switch 12 described above) while the secondary switch 26 (i.e. switch 14) is typically a freewheeling diode (shown as "Dfw").

A current transformer 28 with two single-turn primary windings 30a and 30b and one secondary winding 32 with N-turns is used to sense the two components of the load current 34a and 34b. Primary windings 30a and 30b are connected in series with switches 24 and 26, respectively. Secondary winding 32 is connected to a bridge rectifier 36, burden resistor ($R_B$) 38, and low-pass filter resistor ($R_f$) 40 and capacitor ($C_f$) 42. It should be noted that any component having an equivalent functionality to the current transformer 28 may be installed within circuit 20. For example, a skilled artisan will see that the current transformer 28 may be replaced with Hall-effect sensors specified to have similar functionality.

When primary switch 12 is on (MOSFET 24 in FIG. 2), the first current component flows through the primary winding at Terminals 3 and 4. This component is transformed to the secondary winding 32 as:

$$i_s = \frac{DV_s}{NR}, 0 \le t \le t_{on}$$

When primary switch 24 turns off, the coil current continues to flow, due to the stored energy, but is now diverted into the free-wheeling diode 26 (i.e. secondary switch 14). This second current component now flows through the primary winding at Terminals 1 and 2. Due to the arranged phasing of the current transformer 28, the second current component is transformed to the secondary winding 32 as:

$$i_s = -\frac{DV_s}{NR}, t_{on} \le t \le T$$

The secondary currents are rectified through bridge rectifier 36 to produce a constant current through the burden resistor 38:

$$i_B = \frac{DV_s}{NR}, 0 \le t \le T$$

The value of the burden resistor is calculated to produce a voltage that is equal to the internal voltage reference, $V_r$, of the integrated circuit:

$$R_B = \frac{NR^{V_r}}{DV_s}$$

Thus, the value of burden resistance 38 establishes the feedback voltage to the PWM controller 22 at $V_r$. At this voltage, PWM controller 22 regulates the current through the inductive load to maintain the feedback voltage at this operating point. Thus, the value of RB establishes the value of the constant current through the inductive load.

Figure 3A:
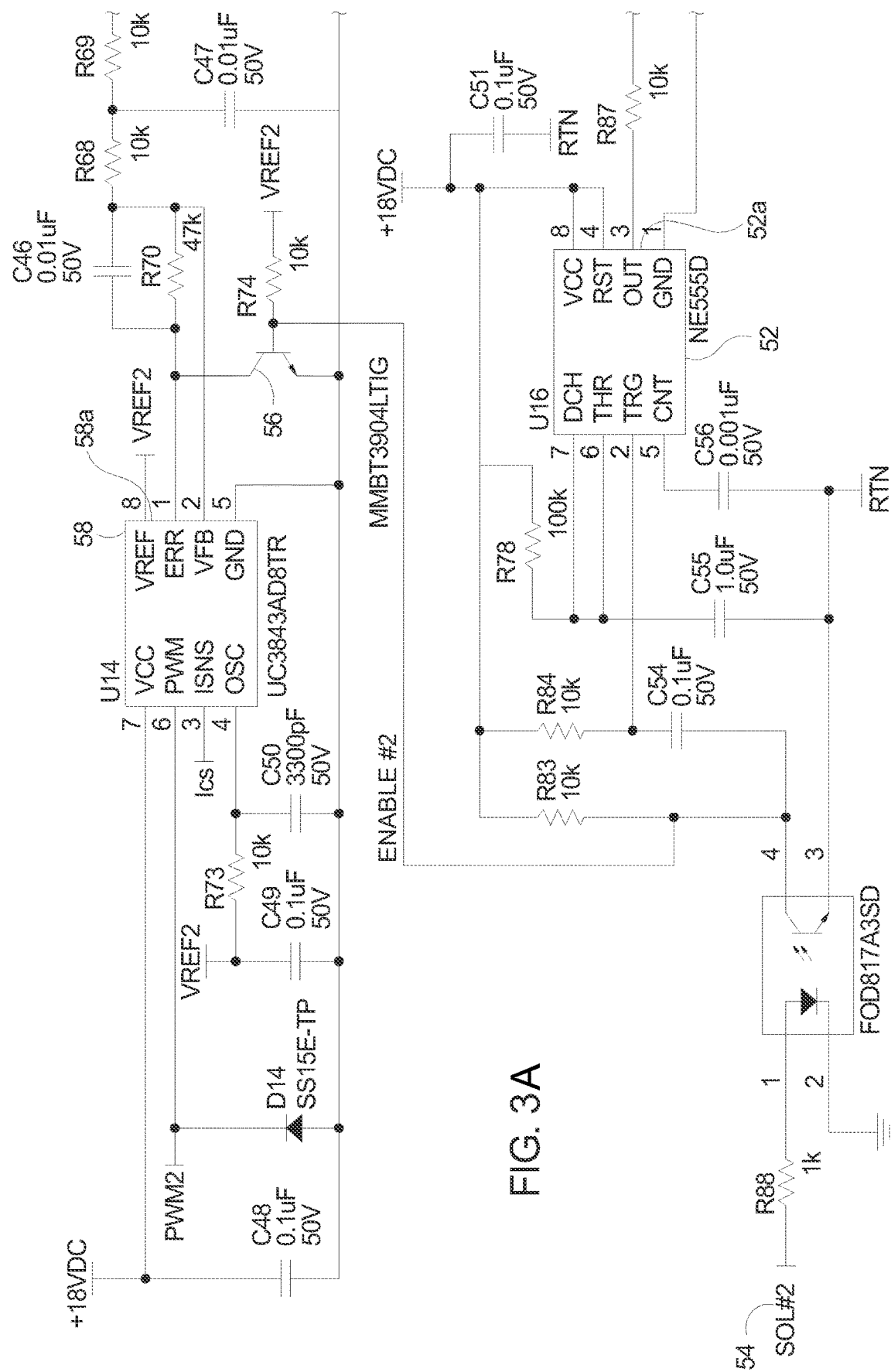
FIGS. 3A and 3B is a schematic of another embodiment of a constant current PWM controller circuit configured for pick and hold states, as disclosed in the '242 patent.
Figure 3B:
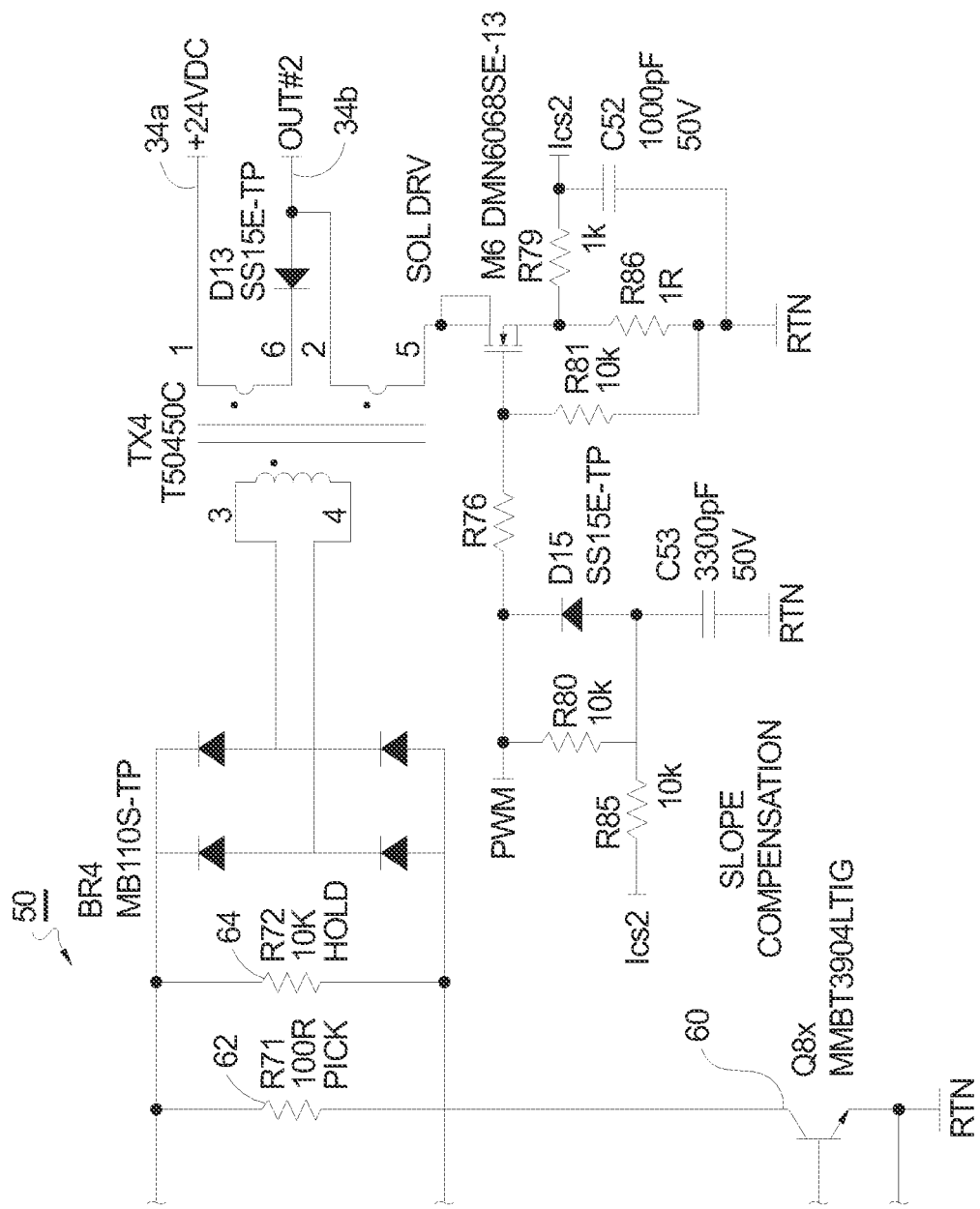

Still further in regard to the disclosure made in the '242 patent, FIG. 3 shows another exemplary circuit schematic 50 that may be suitable for use in conjunction with an electric latch or strike which employs a solenoid. As is recognized in the art, solenoid-driven actuators have long been known for their power inefficiencies. Since their pull-in current (pick current) is higher than the current needed to hold the solenoid plunger in place (hold current), to save energy, it is desirable for the controller to step down the current after the fixed duration of time during which the pick current has been applied.

To improve energy efficiencies, circuit 50 may use a combination of individual resistors in parallel to produce a collective burden resistor that may be used to change the operating current in the solenoid. In the case of a solenoid, two operating points are required, with the first being the pull-in or pick current. This relatively large current is sourced into the solenoid coil for a short time interval to engage the solenoid. Once the solenoid has been actuated, the pick current is followed by a much smaller holding or hold current to maintain the position of the solenoid plunger. In accordance with an aspect of the present invention, this pick and hold operation may be accomplished using a constant current controller by changing the value of the burden resistor once the solenoid has engaged, as will be discussed in greater detail below.

In reference to FIG. 3, circuit 50 makes use of a timer integrated circuit 52 to establish the time interval of the pull-in operation. The timer receives a signal through input 54 that initiates the pull-in interval. With no signal applied, transistor 56 (Q7) is on, Pin 1 (58a) of PWM controller 58 (U14) is pulled to ground such that PWM controller 58 is disabled. As a result, no current flows through the solenoid coil connected at terminals 34a (+24 VDC) and 34b (OUT #2).

When input 54 is switched to logic-level HIGH, PWM controller 58 is enabled and the pick interval starts with a logic-level HIGH at the OUT pin (52a) of timer integrated circuit 52. This output turns on transistor 60 (Q8) and connects resistor 62 (R71) and resistor 64 (R72) in parallel. This combined resistance value establishes the value of the pull-in current. Once the pull-in interval has expired, OUT pin 52a returns to a logic-level LOW, transistor 60 (Q8) turns off, and resistor 62 (R71) is disconnected from the circuit. Resistor 64 (R72) remains as the burden resistance and establishes the hold current of the solenoid. By way of example, if resistor 62 has a resistance of 100 ohms and resistor 64 has a resistance of 10,000 ohms and 24 V is being supplied, the pick current will be about 0.24 A (24 V/99 ohms=0.24 A) while the hold current will be about 2.4 mA (24 V/10,000 ohms=0.0024 A). In this manner, power efficiencies may be realized as high current is applied only for a set, limited period of time before the circuit switches to provide the less-demanding hold current. The above discussion with reference to FIGS. 1-3 was disclosed in the co-pending '242 patent.

A printed circuit board (PCB), as known in the art, is a modular platform of electronic components that are interconnected to form a circuit. The structural base or substrate of the PCB is formed of an insulating material. The circuit itself is formed by a thin layer of conducting material deposited in a pattern on the insulating base. The necessary electronic components making up the desired circuitry may be then placed on the surface of the insulating material and soldered to the deposited conducting material. Thus the overall size of the PCB is substantially dependent upon the types of electronic components needed to form the circuitry and the physical sizes of the electronic components. Further, while the PCB substrate may be approximately 1.5 mm thick and itself flexible, depending on the number of electronic components soldered to the substrate and their physical sizes, the resulting PCB may be rendered relatively rigid and inflexible.

As disclosed in the '464 application, the footprint of MOSFET 24 as disclosed in the '242 patent measures approximately 4.0 mm×5.0 mm and therefore requires a relatively large PCB to contain it and its supporting components. The thickness of MOSFET 24 is approximately 1.75 mm. As a result of these physical attributes of MOSFET 24, and the layout and construction of the necessary supporting electronic components, the size of its PCB becomes relatively large, measuring approximately 30.0 mm×40.0 mm, and is also rendered rigid and inflexible. Consequently, a dedicated space must be provided remote from the electromechanical device for mounting such a large PCB, making a retrofit of the constant-current controller circuit as disclosed in the '242 patent difficult and impractical.

The use of a Gallium Nitride FET (GaNFET) manufactured by Efficient Power Conversion Co. of El Segundo, CA 90245 (part no. EPC2039) as a primary switch in place of MOSFET 24 solves the problem. The physical size of a GaNFET is much smaller than a MOSFET. Therefore, the size of the PCB needed to support the GaNFET is much smaller. Thus, the smaller physical size of a GaNFET/PCB will enable the PCB to be mounted directly on an associated solenoid driver.

Figure 4:
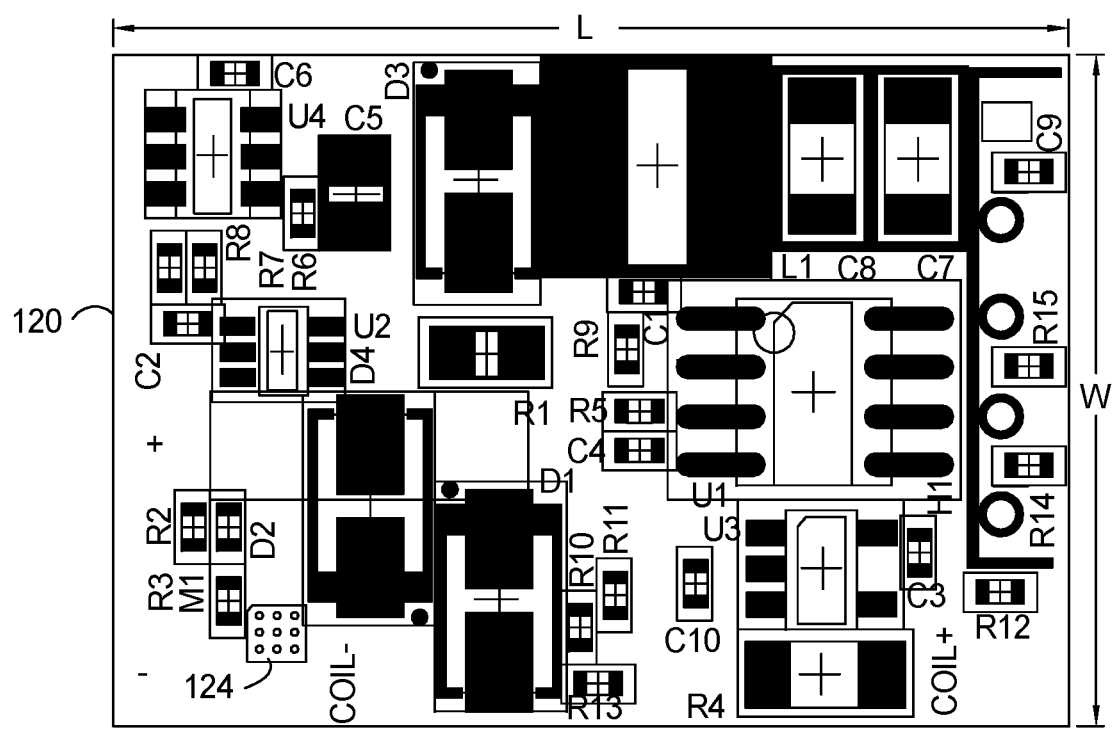
FIG. 4 is a generalized schematic of a PCB containing a GaFNET and its supporting electronic components as disclosed in the '464 application.

Referring to FIG. 4, a magnified view of much smaller PCB 120 of a constant-current control circuit sized to contain GaNFET 124 and its supporting electronic components is shown. The footprint of GaNFET 124 measures approximately 1.35 mm×1.35 mm and is much less than the footprint of MOSFET 24. Its thickness is also less than the thickness of MOSFET 24, measuring approximately 0.625 mm. The result is that a much smaller PCB 120 may be utilized, having a length (L) of approximately 24.1 mm and a width (W) of approximately 17.5 mm. Moreover, PCB 120 is rendered flexible via the use of GaNFET 124.

The use of GaNFET 124 as the primary switch in the circuit enables PCB 120 to be located within the framework of the associated electromechanical device and integrated with the associated solenoid driver itself, making the circuit of a prior art electromechanical devise easily upgraded to a constant-current controller circuit. The upgrade may be accomplished for the most part by a simple replacement of the solenoid driver.

Figure 5:
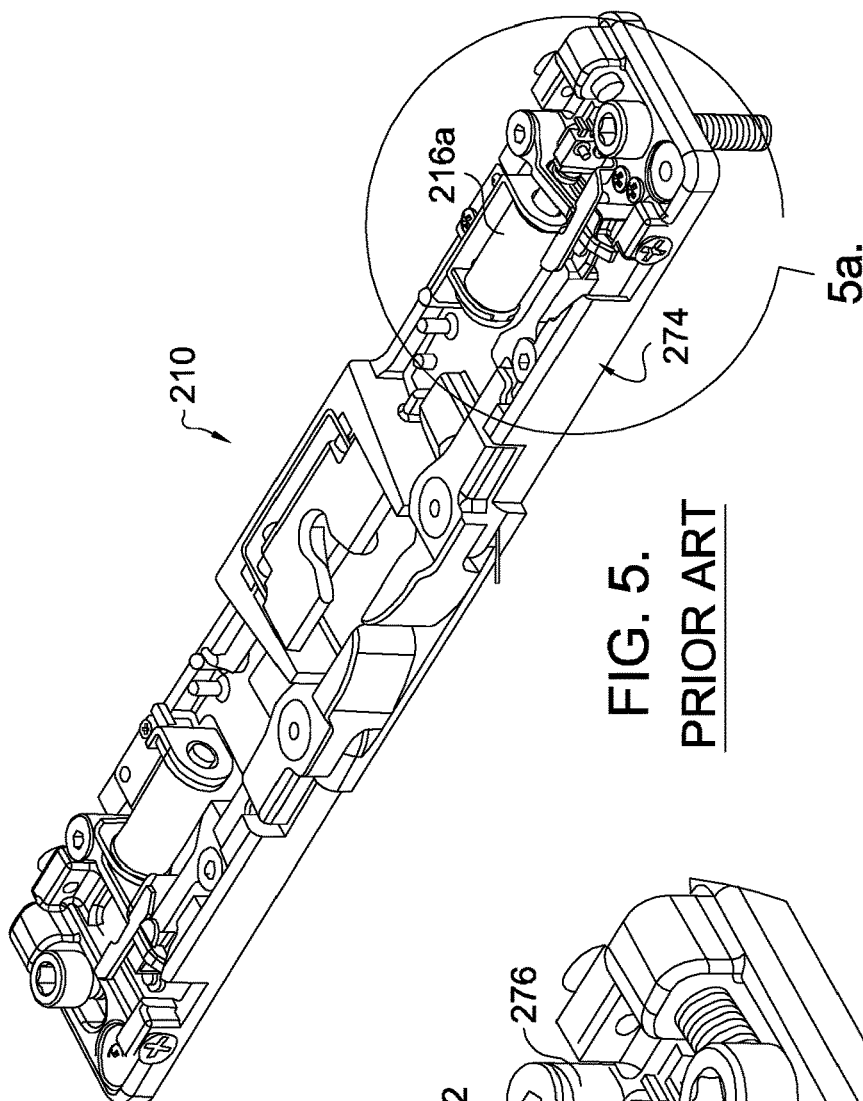
FIGS. 5 and 5A are views of an electric strike assembly.
Figure 5A:
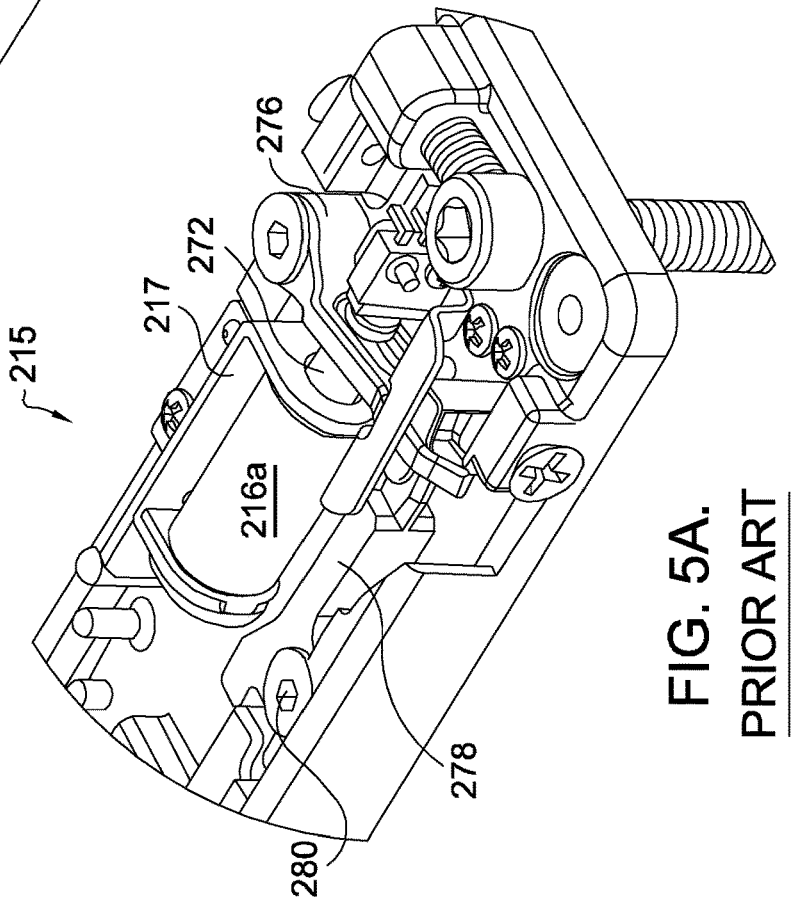

FIGS. 5 and 5A show an example of a prior art electric strike assembly 210 as disclosed in U.S. Pat. No. 8,454,063. Electric strike assembly 210 utilizes two solenoid assemblies 215 and two solenoid drivers 216a to control release of keeper(s) 270 to their unlocked state. Each solenoid assembly includes solenoid driver 216a and solenoid bracket 217.

With reference to FIG. 5A depicting only one side of electric strike assembly 210, when solenoid driver 216a is energized and solenoid plunger 272 extends, actuating components 274 interact with each other to permit keeper 270 to move to its unlocked state. In the example of an electric strike assembly shown, upon extension of plunger 272, release lever 276 rotates, allowing transmission lever 278 to rotate about pivot 280 which in turn releases keeper 270 for movement to its unlocked state. Solenoid assembly 215, solenoid driver 216a and actuating components 274 are located within housing 282 of electric strike assembly 210.

Power for energizing solenoid driver 216a is provided by a switch (not shown) located remote from the strike assembly 210; a feed wire (not shown) connects the switch to solenoid driver 216a. In the example shown, the switch may be a button switch, a keypad, a swipe card, or the like. If strike assembly 210 were to be configured with constant-current circuits 20 or 50, because of its size, the PCB (with included MOSFET 24) would have to be mounted somewhere remote from electric strike assembly 210 making conversion of strike assembly 210 to constant-current circuit configuration difficult.

Referring to FIGS. 6A and 6B, in accordance with the invention disclosed in the '464 application, solenoid assembly 315, including integrated constant-current control circuit is shown. Solenoid assembly 315 includes solenoid bracket 317, solenoid driver 316 and generally planar PCB 120. Cavity 314 of bracket 317 is sized to receive solenoid driver 316. When solenoid driver 316 is energized, plunger 372 of solenoid driver 116 interacts with actuating components (not shown) of associated electromechanical device 310 such as an electrical latch or strike, thereby placing the latch or strike in its locked or unlocked state as known in the art. Flange 330 may extend outward from housing and includes mounting holes 322 for mounting solenoid assembly 315 to the associated electromechanical device 310 with appropriate fasteners (not shown). With the reduced footprint of GaNFET 124, PCB 120 may be attached with fastener 332 to solenoid driver 316 and made part of solenoid assembly 315. Feed wires 326 provide electrical connectivity to PCB 120 and to solenoid driver 316, as needed.

Thus, in accordance with the invention disclosed in FIGS. 6A and 6B of the '464 application, an electromechanical device 210 without a constant-current control circuit may be readily converted to one with a constant-current control circuit by:

a) providing a first electromechanical device 210 without a constant-current control circuit, wherein the first electromechanical device 210 includes a first solenoid assembly 215 comprising a solenoid driver 216a;

b) removing the first solenoid assembly 215;

c) providing a second solenoid assembly 315 comprising a solenoid driver 316 and PCB 120;

d) replacing the removed first solenoid assembly 215 with second solenoid assembly 315; and e) making the required feed wire connections to convert the first electromechanical device 210 to a second electromechanical device 310 having said constant-current control circuit.

Referring to FIGS. 7A and 7B, an alternate embodiment of a solenoid assembly 415 with an integrated constant-current controller circuit in accordance with the invention disclosed in the '464 application is shown. Solenoid assembly 415 includes solenoid mounting bracket 417 and solenoid driver 416. When solenoid driver 416 is energized, plunger 472 of solenoid driver 416 interacts with components (not shown) of the electromechanical device shown schematically as 410. In the case of an electrical latch or strike, such interaction places the associated latch or strike in its locked or unlocked state as known in the art. Tab 430 may extend from mounting bracket 417 for mounting solenoid assembly 415 to the associated electromechanical device by appropriate means as known in the art. With the reduction in size of GaNFET 124, PCB 420 may be flexed into an arcuate shape as shown, assuming the general contour of the outer cylindrical surface of solenoid driver 416. The length (L) and circumference (C) of solenoid driver 416 are sized to accommodate the width (17.53 mm) and length (24.13 mm) of PCB 420, when flexed. As shown in FIG. 7B, flexed PCB 420 may be bonded to the cylindrical surface 440 of solenoid driver 416 as known in the art. A wrap 444 may then by placed over flexed PCB 420 for protection. Feed wires (not shown) provide electrical connectivity to PCB 420 and to solenoid driver 416, as needed.

With respect to the embodiment shown in FIGS. 7A and 7B of the '464 application, an electromechanical device 210 without a constant-current control circuit may be readily converted to one with a constant-current controller circuit by:

a) providing a first electromechanical device 210 without a constant-current controller circuit wherein the first electromechanical device 210 includes a first solenoid assembly 215 comprising a solenoid driver 216a;

b) removing the first solenoid assembly 215;

c) providing a second solenoid assembly 415 comprising a solenoid driver 416 and integrated PCB 420;

d) replacing the removed first solenoid assembly 215 with said second solenoid assembly 415; and e) making the required feed wire connections to convert the first electromechanical device 210 to a second electromechanical device 410 having the constant-current controller circuit.

Thus, solenoid assemblies 315 and 415 may be built into an "as-manufactured" electromechanical device with a self-contained constant current circuit or serve as a "drop-in" replacement for a standard solenoid used in an existing electromechanical device thereby converting the standard circuit to a constant-current control circuit so as to provide the increased efficiency and power savings enjoyed by the circuit disclosed in the '242 patent.

While the above Description of the Preferred Embodiments has disclosed novel and/or improved constant-current control circuits, assemblies and methods of using the same, the Description has heretofore been silent as to a control circuit which can selectively supply a current at a latch system's vibrational resonant frequency so as to overcome a preload condition placed upon a latch or strike keeper (hereinafter referred to as a preloaded latch) of the associated latch system. As is known in the art, a square wave current is supplied to the actuating solenoid having a certain frequency suitable to provide the needed current to the solenoid (both the pick and hold currents) to move the latch to its retracted position. The frequency of the square wave current supplied to the solenoid also induces a sinusoidal vibration wave of the same frequency to the latch system employing the solenoid.

It has been found that, if a sinusoidal vibration wave can be imposed on the latch system by the controller at the natural (resonant) frequency of the latch system, the "resulting vibration" of the latch system imposed by the sinusoidal wave causes the preloaded latch to release. The natural frequency of the latch system that causes the resulting vibration is believed to be dependent, at least in part, on the mass of the components of the latch system involved in the unlatching event and other forces placed on these components. Accordingly, in the event of a preloaded latch preventing retraction of the latch, if the frequency of a pick current supplied to the solenoid by the constant circuitry disclosed in the '242 patent and the '464 application were to be selectively varied to sweep past the resonant frequency of the latch system to induce the resulting vibration, the disclosed circuitry could be used to selectively induce the resulting vibration upon the latch system to free the preloaded latch. Once the latch is released, the current frequency supplied to the solenoid may then be returned to a lower modulation needed to hold the solenoid in its energized state and to keep the latch retracted.

Figure 8:
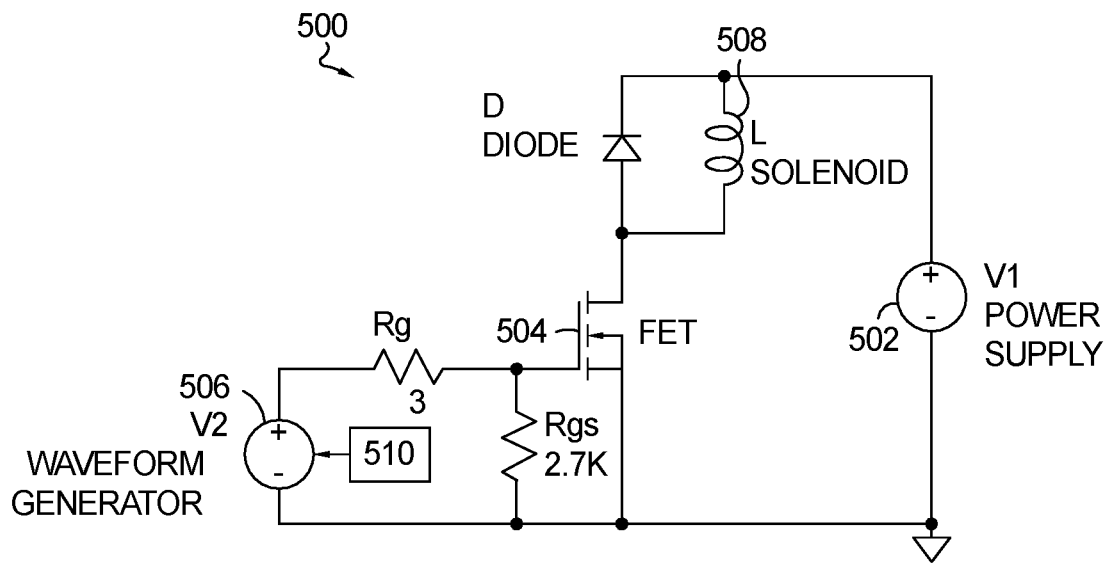
FIG. 8 is a functional schematic of a preload circuit, in accordance with an aspect of the present invention.

Turning now to FIG. 8, a schematic of an exemplary circuit 500 for inducing resulting vibration upon a latch system having a preloaded latch includes a power supply 502, FET 504 which may be either MOSFET or GaNFET described above, a function generator, such as but not limited to waveform generator 506, and solenoid 508 which may generally represent a solenoid driver of an electromechanical device, such as electromechanical device 210 or 310. During operation, power supply 502 is activated upon receipt of a valid instruction at a remote switch (e.g., a credential device such as a key pad or swipe card, etc.). Power supply 502 may then output the pick current to solenoid 508 so as to release the latch, then to return to a hold current as described above.

In accordance with an aspect of the present invention, the supplied voltage from power supply 502 may be conditioned by waveform generator 506 to induce a resulting vibration upon the latch. In one embodiment, upon installation of the latch system, an installer may utilize waveform generator 506 to sweep a range of frequencies until inducing a resulting vibration upon the latch system. For example, a resulting vibration upon the latch system may be identified by noting a frequency (i.e., a target frequency) in the swept frequency range where an audible vibration of the latch system may be heard, for example, 45 Hz. The target frequency or a range of frequencies surrounding the noted target frequency of the generated waveform causing the vibration, for example, +/−20 Hz of the noted target frequency, may then be recorded and saved within a system memory located on the PCB, such as PCB 120. Solenoid 508 may then receive the pick current at the target frequency or the saved range of frequencies each time power is supplied to the solenoid to assure retraction of the latch. In the alternative, the target frequency or saved range of frequencies may be provided to the solenoid only when a latch preload condition is sensed, as described below.

In accordance with a further aspect of the present invention, the resonant frequency of the latch system needed to induce the resulting vibration upon the latch system may change over time, such as due to wear and tear on the various components of the latch system or as a result of environmental changes. As a result, the previously saved target frequency or range of frequencies may not cover the frequency needed to induce the resulting vibration upon the latch system to release the latch when the latch system is under preload. To remedy this, waveform generator 506 may be configured to re-sweep the frequencies a preset interval or preset intervals until an updated target frequency or updated range of frequencies of the latch system is determined to present a frequency that causes a resulting vibration of the latch system. This updated target frequency or updated range of frequencies may then be recorded and saved within the system memory. Solenoid 508 may then receive the pick current at the updated target frequency or updated range of frequencies each time power is supplied to the solenoid.

Further, the preload condition may vary wherein the latch experiences only a periodic preload condition such as when an occasional wind blows against the door or when an exiting person pushes the door to open before the latch or keeper has time to retract. In that situation, instead of providing the target frequency or saved range of frequencies each time power is provided to the solenoid, the target frequency or saved range of frequencies may be provided to the solenoid as pick current only when a latch preload condition is sensed.

In conjunction with this embodiment, a latch preload sensor 510 may be used to sense a latch preload condition as shown schematically in FIG. 8. The latch preload sensor would sense when latch movement is sluggish or when the latch has not moved at all upon initiating a signal to open the latch. For example, latch preload sensor 510 may include a latch position sensor and a timer to sense a latch preload condition. If a predetermined amount of latch travel is not sensed by the position sensor within a predetermined period of time, the latch preload sensor could signal waveform generator 506 to a provide a pick current to solenoid 508 at the target frequency or saved range of frequencies to overcome the preload forces and to retract the latch. The latch position sensor could then be used to confirm full retraction of the latch. If full retraction is not indicated, a further signal could be provided to again provide a pick current at the target frequency or saved ranges of frequencies, or at an enlarged range of frequencies, and an alert may be provided indicating that repairs to the latch system are needed. As further examples, the latch preload sensor may utilize any other mechanical, electrical or magnetic field strength sensing means for detecting a latch preload condition.

Figure 9:
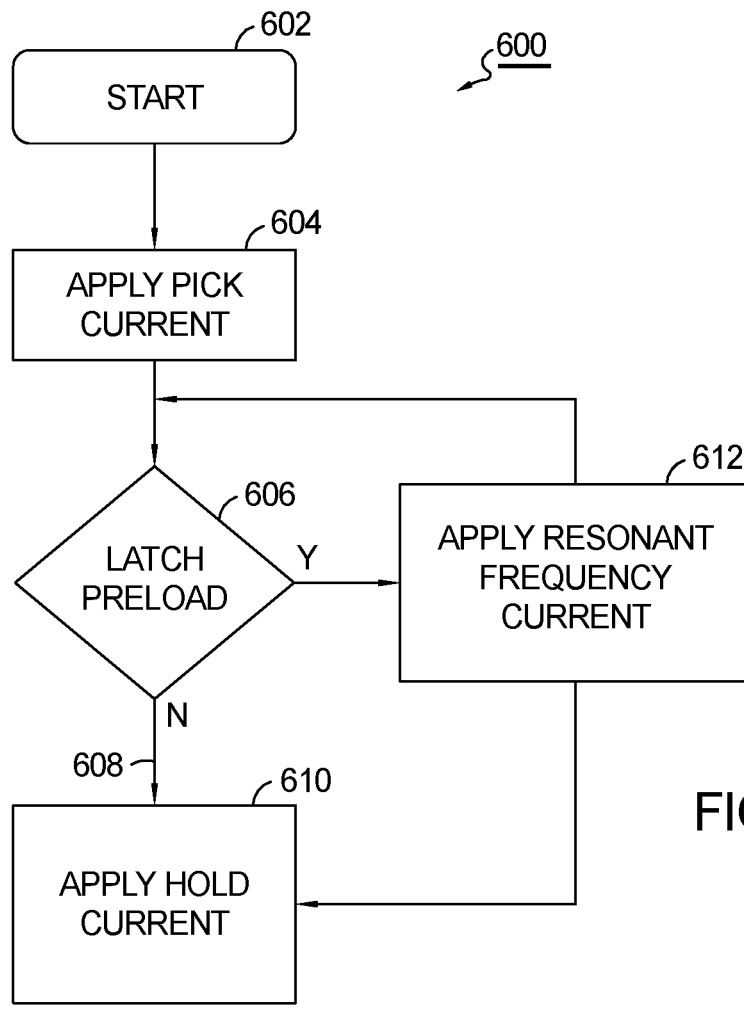
FIG. 9 is a schematic flow chart of a method of releasing a latch under a preload condition.

Turning now to FIG. 9, shown is a flow chart illustrating an operating method 600 for releasing a preloaded latch of an electromechanical latch system in accordance with one aspect of the invention. At step 602, when the latch of an electromechanical latch system is in its default, locked condition, the solenoid driver of the latch is not energized (in this example, the electromechanical latch system is set to a fail-secure mode). At step 604, access credentials are presented to and verified by authentication device (e.g., keypad, biometric sensor, button, etc.) wherein the authentication device communicates with waveform generator 506 to supply a baseline pick current to the solenoid driver at a sufficient level to pull back the latch under normal operating conditions (i.e., when the latch is not preloaded). At step 606, latch preload sensor 510 interrogates whether a latch preload condition exists. If the preload sensor determines that a latch preload does not exist, at step 608, a communication is provided to waveform generator 506 to reduce the baseline pick current to a hold current 610 to the solenoid driver at a sufficient level to hold the latch in a released, unlocked condition. Upon receipt of the communication from the preload sensor by the waveform generator at step 608, the hold current may be supplied by the waveform generator after a predetermined period of time elapses since application of the baseline pick current to assure retraction of the latch is complete or after retraction of the latch/keeper is confirmed by preload sensor 510.

If the preload sensor determines that a latch preload does exist at step 606, a communication is provided to waveform generator 506 at step 612 to supply a pick current at a predetermined target frequency or range of frequencies sufficient to free the latch from its preload condition to a released, unlocked condition. Thereafter, the method may proceed to step 610, applying a hold current to the solenoid driver as described above. If a latch preload condition continues to be sensed by the preload sensor, the target frequency or range of frequencies may be reapplied, or an enlarged range of frequencies may be applied as a pick current and an optional alert signal may be provided indicating that repairs to the latch system are needed.

In the above described method, at step 612, the range of frequencies sufficient to free the latch to a released, unlocked condition has been previously determined. In another aspect of the invention wherein the range of frequencies has not been predetermined, after the latch preload sensor has sensed that a latch preload exists, waveform generator may supply current at a varying frequency, sweeping the frequency between the baseline pick current frequency and a pre-designated, outer limit of pick current frequencies so as to force the latch system to vibrate and to release the preloaded latch. Once the current frequency sweep is completed sufficient to free the latch, the method proceeds to steps 608 or 612 as discussed above.

In yet another embodiment, each time access credentials are presented to and verified by the authentication device, the baseline pick current is provided to the solenoid driver as in step 604, followed by a sweep through the predetermined range of frequencies needed to free a latch from a preload condition in the event the latch is preloaded to assure that the latch becomes fully retracted. A preload sensor may be added to confirm full latch retraction.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A latch system including a latch or a keeper, and a solenoid assembly, wherein the solenoid assembly is used to drive the latch or the keeper of the latch system to a retracted position, the solenoid assembly comprising:
   a) a solenoid driver coupled to a power supply;
   b) a preload sensor, including a timer and a latch position sensor or keeper position sensor, wherein the preload sensor is configured to sense whether a preloaded condition is present at the latch or the keeper; and
   c) a function generator in communication with the solenoid driver and the preload sensor, wherein the function generator is configured to selectively sweep a frequency of a pick current across a first range of frequencies, wherein the pick current is output from the power supply and provided to the solenoid driver,
   wherein, when the preload sensor determines a preloaded condition is present at the latch or the keeper, the frequency is swept across the first range of frequencies by the function generator until the pick current induces a resulting vibration of the latch system at a target frequency within the first range of frequencies,
   wherein upon inducing the resulting vibration of the latch system, the latch or the keeper is released from the preloaded condition,
   wherein a second range of frequencies is determined after the first range of frequencies is swept and falls within the first range of frequencies, and wherein the second range of frequencies includes the target frequency, and
   wherein the second range of frequencies is swept by the function generator to induce the resulting vibration of the latch system and release the latch or the keeper from the preloaded condition.

2. The latch system of claim 1 wherein when the preload sensor does not sense, via the timer and the latch position sensor or keeper position sensor, a predetermined amount of latch or keeper travel within a predetermined period of time, the preload sensor provides, to the function generator, a signal indicating that the preloaded condition is present at the latch or the keeper.

3. The latch system of claim 2, wherein when the latch position sensor or keeper position sensor senses the preloaded condition is present at the latch or the keeper, after the function generator sweeps the frequency of the pick current across the first range of frequencies, the preload sensor provides:
   i) a second signal indicating to the function generator to provide the pick current at one of the target frequency, the first range of frequencies, the second range of frequencies, or an enlarged range of frequencies, and
   ii) an alert indicating that repairs to the latch system are needed.

4. The latch system of claim 1 wherein the function generator is a waveform generator.

5. The latch system of claim 1 wherein the solenoid assembly further comprises a switching circuit connected with the solenoid driver, and
   wherein the switching circuit comprises a metal-oxide-semiconductor field effect transistor (MOSFET) or a gallium nitride field effect transistor (GaNFET).

6. The latch system of claim 1 wherein the target frequency to induce the resulting vibration is a predetermined target frequency.

7. The latch system of claim 6 wherein the first range of frequencies is +/−20 Hz of the predetermined target frequency.

8. The latch system of claim 1 wherein the solenoid assembly further comprises a memory,
wherein the second range of frequencies is stored in the memory of the solenoid assembly, and
wherein the second range of frequencies is provided by the function generator each time the pick current is provided to the solenoid driver.

9. A method for releasing a latch or a keeper of a latch system from a preloaded condition, wherein the latch system further comprises: a solenoid driver, a preload sensor, and a function generator, wherein the solenoid driver is configured for releasing the latch or the keeper, wherein the preload sensor includes a timer and a latch position sensor or keeper position sensor, wherein the preload sensor is configured to sense whether a preloaded condition is present at the latch or the keeper, and wherein the function generator is configured for providing a pick current to the solenoid driver, the method comprising steps of:
a) sensing that the preloaded condition is present at the latch or the keeper;
b) providing the pick current to the solenoid driver by sweeping a first range of pick current frequencies using the function generator to identify a target frequency that induces a resulting vibration of the latch system;
c) after the first range of pick current frequencies is swept, establishing a second range of pick current frequencies that falls within the first range of pick current frequencies, wherein the second range of pick current frequencies includes the target frequency;
d) applying the pick current at the second range of pick current frequencies to the solenoid driver to release the latch or the keeper from the preloaded condition by the induced resulting vibration;
e) sensing that the latch or the keeper is not fully retracted after the function generator sweeps the frequency across the first range of frequencies; and
f) when the latch or the keeper is not fully retracted after the function generator sweeps the frequency across the first range of frequencies, providing a second signal indicating to the function generator to again provide the pick current at one of the target frequency, the first range of frequencies, the second range of frequencies, or an enlarged range of frequencies.

10. The method of claim 9 wherein the step of sensing that the preloaded condition is present at the latch or the keeper comprises sensing, via the timer and the latch position sensor or keeper position sensor, that the latch or the keeper has not travelled a predetermined amount within a predetermined period of time.

11. The method of claim 9, wherein the method further comprises steps of:
g) when the latch or the keeper is not fully retracted after the function generator sweeps the frequency across the first range of frequencies, providing an alert indicating that repairs to the latch system are needed.

12. The method of claim 9 wherein the function generator is a waveform generator.

13. The method of claim 9 wherein the target frequency to induce the resulting vibration is a predetermined target frequency.

14. The method of claim 13 wherein the second range of pick current frequencies is +/−20 Hz of the target frequency.

15. The method of claim 9 further comprising a step of storing the target frequency in a memory of the latch system.

16. The method of claim 9 further comprising a step of storing the second range of pick current frequencies in a memory of the latch system.

17. The method of claim 9 wherein the application of the pick current at the second range of pick current frequencies to the solenoid driver occurs each time the pick current is provided to the solenoid driver.

18. The method of claim 9 wherein the application of the pick current at the second range of pick current frequencies to the solenoid driver occurs only when the latch or the keeper is in the preload condition.

19. A method for releasing a latch or a keeper of a latch system from a preloaded condition, wherein the latch system further comprises: a solenoid driver, a preload sensor, and a function generator, wherein the solenoid driver is configured for releasing the latch or the keeper, wherein the preload sensor includes a timer and a position sensor, wherein the preload sensor is configured to sense whether the preloaded condition is present at the latch or the keeper, and wherein the function generator is configured for providing a pick current to the solenoid driver, the method comprising steps of:
a) sensing that the preloaded condition is present at the latch or the keeper;
b) providing the pick current to the solenoid driver by sweeping a first range of pick current frequencies using the function generator to identify a target frequency that induces a resulting vibration of the latch system;
c) after the first range of pick current frequencies is swept, establishing a second range of pick current frequencies that falls within the first range of pick current frequencies, wherein the second range of pick current frequencies includes the target frequency;
d) applying the pick current at the second range of pick current frequencies to the solenoid driver to release the latch or the keeper from the preloaded condition by the induced resulting vibration;
e) sweeping a third range of pick current frequencies using the function generator to identify a second target frequency that induces the resulting vibration of the latch system;
f) establishing a fourth range of pick current frequencies that falls within the third range of pick current frequencies, wherein the fourth range of pick current frequencies includes the second target frequency, wherein the fourth range of pick current frequencies is different than the second range of pick current frequencies; and
g) applying the pick current at the fourth range of pick current frequencies to the solenoid driver to release the latch or the keeper from the preloaded condition by the induced resulting vibration.

20. The method of claim 19 wherein steps e) through g) are repeated at a preset interval or preset intervals.

21. The method of claim 19 further comprising a step of storing the second target frequency in a memory of the latch system.

22. The method of claim 19 further comprising a step of storing the fourth range of pick current frequencies in a memory of the latch system.

23. The method of claim 19 wherein the application of the pick current at the fourth range of pick current frequencies to the solenoid driver occurs each time the pick current is provided to the solenoid driver.

24. The method of claim 19 wherein the application of the pick current at the fourth range of pick current frequencies to the solenoid driver occurs only when the latch or the keeper is in the preload condition.

25. The method of claim 19 wherein the third range of pick current frequencies is equal to the first range of pick current frequencies.

26. The method of claim 19, wherein the method further comprises steps of:
   h) sensing that the latch or the keeper is not fully retracted after the function generator sweeps the frequency across the first range of frequencies,
   i) when the latch or the keeper is not fully retracted after the function generator sweeps the frequency across the first range of frequencies, providing a second signal indicating to the function generator to again provide the pick current at one of the target frequency, the first range of frequencies, the second range of frequencies, or an enlarged range of frequencies, and
   j) providing an alert indicating that repairs to the latch system are needed.

* * * * *